United States Patent [19]

Uemiya et al.

[11] Patent Number: 4,780,510
[45] Date of Patent: Oct. 25, 1988

[54] CROSS-LINKED OPTICAL SILOXANE POLYMER

[75] Inventors: Takafumi Uemiya; Yoshitaka Osawa; Shin-ichiro Niwa; Akira Nishimura; Yutaka Shibata, all of Osaka, Japan

[73] Assignee: Sumitomo Electric Industries, Ltd., Osaka, Japan

[21] Appl. No.: 860,178

[22] Filed: May 6, 1986

[30] Foreign Application Priority Data

May 7, 1985 [JP] Japan .................................. 60-97633
May 30, 1985 [JP] Japan ................................ 60-118446

[51] Int. Cl.$^4$ .................... C08F 130/08; C08F 283/12
[52] U.S. Cl. ................................. 525/326.5; 525/342; 525/477; 526/279
[58] Field of Search ............ 525/477, 479, 478, 326.5, 525/342, 359.5, 101; 526/279; 527/107

[56] References Cited

U.S. PATENT DOCUMENTS

| | | | |
|---|---|---|---|
| 3,996,189 | 1/1976 | Trovnicek | 523/107 |
| 4,332,922 | 6/1982 | Kossmehl et al. | 525/479 |
| 4,559,396 | 12/1985 | Sasaki et al. | 525/479 |

FOREIGN PATENT DOCUMENTS

| | | |
|---|---|---|
| 2443247 | 3/1975 | Fed. Rep. of Germany . |
| 1055777 | 1/1967 | United Kingdom . |
| 1093904 | 12/1967 | United Kingdom . |
| 1454858 | 11/1976 | United Kingdom . |

*Primary Examiner*—Joseph L. Schofer
*Assistant Examiner*—Peter F. Kulkosky
*Attorney, Agent, or Firm*—Cushman, Darby & Cushman

[57] ABSTRACT

A cross-linked optical siloxane polymer having a group for modifying a refractive index of the polymer which is introduced in a side chain of the polymer by a hydrosilyl reaction of one of the following systems:

(1) a compound (A) having a carbon-carbon unsaturated bond and a group for modifying a refractive index, and a siloxane polymer (B) having a silicon hydride group wherein the molar ratio of the silicon hydride group to the carbon-carbon unsaturated bond is more than 1, and (2) a compound (A') having a silicon hydride group and a group for modifying a refractive index, and a siloxane polymer (B') having a carbon-carbon unsaturated bond wherein the molar ratio of the carbon-carbon unsaturated bond to the silicon hydride group is more than 1, the polymer being cross-linked by a hydrosilyl reaction of the unreacted silicon hydride groups of the silxane polymer (B) with a compound (C) having at least two carbon-carbon unsaturated bonds when the system (1) is used, or by a hydrosilyl reaction of the unreacted carbon-carbon unsaturated bonds of the siloxane polymer (B') with a compound (C') having at least two silicon hydride groups when the system (2) is used, the refractive index of which is easily and precisely modified.

7 Claims, No Drawings

CROSS-LINKED OPTICAL SILOXANE POLYMER

FIELD OF THE INVENTION

The present invention relates to a cross-linked optical siloxane polymer which is easily processed, for example, by casting, and has a controlled refractive index. More particularly, it relates to a cross-linked siloxane polymer a refractive index of which is widely and precisely modified by changing a kind and amount of a group for changing the refractive index as a side chain of the siloxane polymer.

BACKGROUND OF THE INVENTION

Hitherto, glass is widely and largely used as an optical material since it has a variety of refractive indexes and dispersion values. However, glass has several drawbacks. For example, the refractive index of glass is large and any glass with a low refractive index and large dispersion has not been produced. Since glass has poor processability, the production of an unsymmetric lens costs much. Glass has large specific gravity. In addition, glass is hard and fragile.

As an economical optical material with good processability, there are known plastics such as polymethyl methacrylate and polystyrene. However, the number of practically useful plastic optical materials is not large. Further, the plastic optical material has poor heat resistance and/or flexibility. It is not easy to produce an article of a complicated shape from the plastic optical material.

A cross-linked optical siloxane polymer is an attractive optical material, since it has not only good processability but also good transparency and heat resistance, and rubbery elasticity and after cured.

U.S. Pat. No. 3,228,741 (issued on Jan. 11, 1966) discloses a gas permeable contact lens made of a transparent silicone rubber.

U.S. Pat. No. 3,996,189 (issued on Dec. 7, 1976) discloses a method for matching a refractive indexes of a silica filler and of a siloxane polymer with each other, in which a suitable amount of a siloxane polymer containing phenyl groups so as to match the refractive index of the siloxane polymer with that of the silica filler to produce an optically transparent siloxane polymer composition. In this method, a siloxane polymer having vinyl groups at both chain ends and 6 to 16% by mole of the phenyl groups and a siloxane polymer having silicon hydride groups ($\equiv$SiH) at both ends are subjected to an addition reaction in the presence of a platinum catalyst, namely hydrosilyl reaction to give a transparent cross-linked siloxane polymer.

Further, Japanese Patent Kokai Publication (unexamined) No. 130844/1980 (laid open to public inspection on Oct. 11, 1980) describes the use of a polymeric composition comprising a siloxane polymer containing phenyl groups blocked with vinyl groups at both chain ends and having a viscosity of 100 to 15,000 cP at 25° C. with a molar ratio of methyl/phenyl of 1:1 to 10:1, a siloxane polymer containing a silicon hydride group and having a viscosity of 0.5 to 5,000 cP at 25° C. and a platinum compound as a cladding material of an optical glass fiber.

U.S. Pat. No. 3,341,490 (issued on Oct. 12, 1967) discloses a transparent siloxane polymer composition comprising a blend of dimethylsiloxane/phenylmethylsiloxane copolymer and dimethylsiloxane/methylvinylsiloxane copolymer and a reinforcing silica filler.

In all of the conventional arts, the refractive index of the transparent siloxane polymer was modified by the addition of the siloxane polymer containing the phenyl groups.

One known method for modifying the refractive index of the siloxane polymer comprises homo- or copolymerizing a cyclic siloxane monomer having a phenyl group (e.g. 1,3,5-trimethyl-1,3,5-triphenylcyclotrisiloxane, 1,3,5,7-tetramethyl-1,3,5,7-tetraphenylcyclotetrasiloxane, hexaphenylcyclotrisiloxane, octaphenylcyclotetrasiloxane and the like) and cross-linking the polymer with a polymeric material or a blend of a siloxane polymer such as dimethylsiloxane/diphenylsiloxane copolymer, dimethylsiloxane/methylphenylsiloxane and methylphenylsiloxane polymer to which vinyl groups and/or silicon hydride groups are introduced for cross-linking.

However, these conventional methods have several drawbacks such that:

1. Since the refractive index is modified by the content of the phenyl group, the refractive index can not be changed beyond a certain range.
2. Since preparation and purification of the siloxane monomer having the phenyl group is rather difficult, it is very expensive to produce a monomer which is pure enough to be used as an optical material.
3. Trial and error polymerization is required to precisely control the refractive index of the siloxane polymer by the use of the siloxane monomer having the phenyl group.
4. In order to provide several kinds of siloxane polymers having different refractive indexes, it is necessary to produce polymers with varying kinds and/or amounts of the comonomer to be copolymerized. This is troublesome in view of quality control and investory control.
5. When the refractive index of the siloxane polymer is modified by polymer blending, kinds of the siloxane polymers are limited by their compatibility. Even if the siloxane polymers having good compatibility are used, the blend has large Rayleigh scattering so that the transparency of the blend is deteriorated.

However, none of the conventional art intends to precisely control the refractive index of the siloxane polymer since the polymer is used, for example, as a contact lens. Nevertheless, the control of the refractive index of the siloxane polymer is important, since such control is basic technique for designing an optical wave guide, an optical fiber and a lens. In addition, to achieve good light transmission in an optical transmission system, refractive indexes of materials and/or elements should be matched. For this end, precise control of the refractive index of the siloxane polymer is highly desired.

SUMMARY OF THE INVENTION

One object of the present invention is to provide a cross-linked optical siloxane polymer having a wide variety of refractive indexes.

Another object of the present invention is to provide a cross-linked optical siloxane polymer a refractive index of which is easily, widely and precisely modified.

Further object of the present invention is to provide a cross-linked optical siloxane polymer which can be prepared without synthesizing or polymerizing a siloxane monomer having a group for modifying a refractive index.

These and other objects are accomplished by a cross-linked optical siloxane polymer having a group for modifying a refractive index of the polymer which is introduced in a side chain of the polymer by a hydrosilyl reaction of one of following systems:

(1) a compound (A) having a carbon-carbon unsaturated bond and a group for modifying a refractive index, and a siloxane polymer (B) having a silicon hydride group wherein the molar ratio of the silicon hydride group to the carbon-carbon unsaturated bond is more than 1, and (2) a compound A') having a silicon hydride group and a group for modifying a refractive index, and a siloxane polymer (B') having a carbon-carbon unsaturated bond wherein the molar ratio of the carbon-carbon unsaturated bond to the silicon hydride group is more than 1, the polymer being cross-linked by a hydrosilyl reaction of the unreacted silicon hydride groups of the siloxane polymer (B) with a compound (C) having at least two carbon-carbon unsaturated bond when the system (1) is used, or by a hydrosilyl reaction of the unreacted carbon-carbon unsaturated bonds of the siloxane polymer (B') with a compound (C') having at least two silicon hydride groups when the system (2) is used.

DETAILED DESCRIPTION OF THE INVENTION

According to the present invention, the compound (A) or (A') having the group for modifying the refractive index is reacted with the siloxane polymer (B) or (B') so as to introduce a required amount of the group for modifying the refractive index in the side chain of the polymer by the hydrosilyl reaction.

Since the siloxane polymer (B) or (B') has an excessive number of the sites which react with the compound (A) or (A') having the group for modifying the refractive index, the polymer having various refractive indexes can be produced from one kind of the siloxane polymer by changing the amount of the compound having the group for modifying the refractive index to be reacted with the unmodified siloxane polymer.

The hydrosilyl reaction is a reaction of the silicon hydride group and the carbon-carbon unsaturated group represented by the following reaction scheme:

The carbon-carbon unsaturated group includes a vinyl group, an allyl group, an isopropenyl group and the like. Among them, the vinyl group is preferred.

According to the present invention, the group for modifying the refractive index is introduced by the hydrosilyl reaction of one of two systems.

In the first system (1), the compound (A) having the group for modifying the refractive index has also the carbon-carbon unsaturated group, the siloxane polymer (B) has the silicon hydride group and the compound (C) has at least carbon-carbon unsaturated bonds.

In this system, the siloxane polymer (B) may have the following chemical formula:

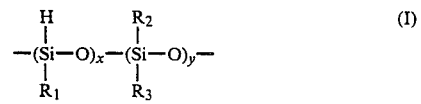

wherein $R_1$ is a hydrogen atom or a $C_1$-$C_{12}$ alkyl or alkoxy group; $R_2$ and $R_3$ are, the same or different, each a $C_1$-$C_{12}$ alkyl or alkoxy group; and x and y are each a positive integer. Preferably, the alkyl or alkoxy grop is a $C_1$-$C_3$ alkyl or alkoxy group. Specific examples of them are methyl, ethyl, methoxy and ethoxy. Among them, methyl is preferred. The siloxane polymer has such a molecular weight that it is in a liquid state at a room temperature, for example, 1,000 to 1,000,000, preferably 5,000 to 300,000.

The compound (A) having the group for modifying the refractive index and the carbon-carbon unsaturated group may be represented by the following chemical formula:

As described in the above, examples of the unsaturated bond are the vinyl group, the allyl group and the isopropenyl group.

$R_4$, $R_5$, $R_6$ and $R_7$ are the same or different and each a $C_1$-$C_3$ alkyl or alkoxy group, a $C_3$-$C_8$ cycloalkyl group, an aromatic group, and the like. These groups may be fluorinated. At least one of them should be the group for modifying the refractive index. Specific examples of the compound (II) are styrene, α-methylstyrene, 2-vinylnaphthalene, 9-vinylanthracene, perfluorooctylethylene and the like.

The group for modifying the refractive index of the siloxane polymer may be an aromatic group or a halogenated hydrocarbon group including a perfluorocarbon group. For increasing the refractive idex, the aromatic groups such as phenyl, naphthyl, anthryl, pyrenyl and the like are preferred. For decreasing the refractive index of the siloxane polymer, the haogenated hydrocarbon groups particularly fluorocarbon groups such as a trifluoropropyl group are preferred.

The compound (C) for cross-linking the modified siloxane polymer (B) may be represented by following formula:

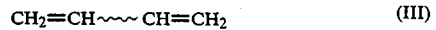

or

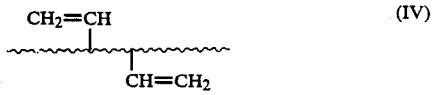

wherein ~~~~~~represents an organic group.

Examples of the organic group are aromatic groups (e.g. phenylene, naphthalene, biphenyl and the like), aralkyl groups (e.g. pheny-$C_1$-$C_{12}$-alkyl, tolyl-$C_1$-$C_{12}$-alkyl, naphthyl-$C_1$-$C_{12}$-alkyl), aliphatic groups (e.g. $C_1$-$C_{12}$ alkyl or $C_3$-$C_8$ cycloalkyl), substituted or unsubstituted siloxane groups. Among them, a group having at least one phenyl group is preferred since the phenyl group can increase the refractive index of the siloxane polymer.

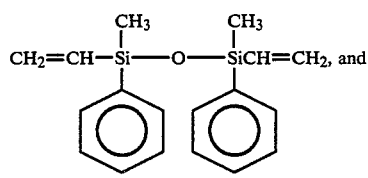

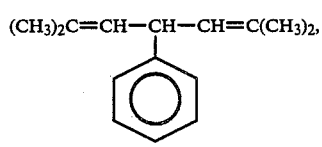

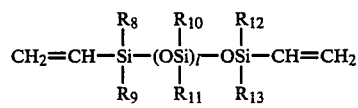

wherein l is 0 or a positive integer. Specific examples of the compound (IV) are

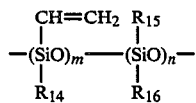

wherein m is an integer not less than 2 and n is 0 or a positive integer. Preferably, the substituents $R_8$ to $R_{16}$ are a hydrocarbon group except a vinyl group. The hydrocarbon group includes a $C_1$–$C_{12}$ alkyl group (e.g. methyl, ethyl and the like), a $C_1$–$C_{12}$ alkoxy group (e.g. methoxy, ethyoxy and the like) and an aromatic group. The substituent may be a cyano group, and the like. A molecular weight of the compound (IV) is preferably less than that of the siloxane polymer (B).

The cross-linking of the siloxane polymer may be carried out after the hydrosilyl reaction of the compound (A) and the siloxane polymer (B), although it may be carried out during the hydrosilyl reaction by adding the compound (C) so that both hydrosilyl reactions proceed competitively.

A typical cross-linking reaction may be represented by the following reaction scheme:

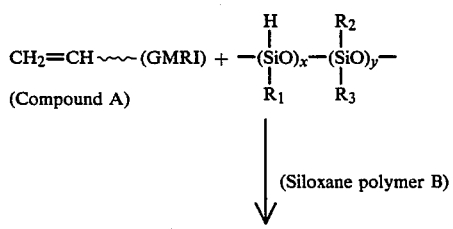

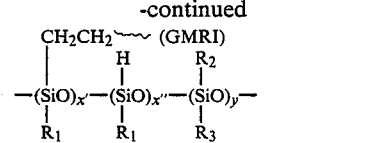

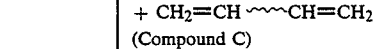

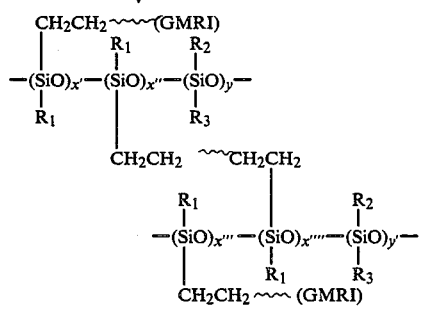

wherein (GMRI) is a group for modifying the refractive index, x, x', x'', x''', x'''', y and y' are each a positive integer, and $R_1$, $R_2$ and $R_3$ are the same as defined above.

In the second system (2), the compound (A') having the group for modifying the refractive index also has the silicone hydride group, the siloxane polymer (B') has the carbon-carbon unsaturated group and the compound (C') has at least two silicon hydride groups.

In this system, the siloxane polymer (B') may have the following chemical formula:

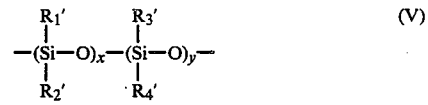

wherein $R_1'$, $R_2'$, $R_3'$ and $R_4'$ are, the same or different, a a $C_1$–$C_{12}$ alkyl or alkoxy group with the proviso that at least one of them is the carbon-carbon unsaturated group or a group containing said unsaturated group; and x and y are the same as defined above. Preferably, the alkyl or alkoxy group is a $C_1$–$C_3$ alkyl or alkoxy group. Preferably, the both chain terminals of the polymer are blocked by the carbon-carbon unsaturate groups.

Examples of the compound (A') having the group for modifying the refractive index and the silicon hydride group may be represented by the following chemical formula:

or

wherein $R_5'$, $R_6'$ and $R_7'$ are, the same or different, an aromatic group (e.g. phenyl, naphthyl, anthryl, biphenyl, and the like), a $C_1$–$C_8$ alkyl or alkoxy group or a $C_3$–$C_6$ cycloalkyl group with the proviso that at least one of them is the group for modifying the refractive index.

Specific examples of said silane compound (VI) are phenyldimethylsilane, diphenylmethylsilane, phenylsilane, diphenylsilane, methylphenylsilane, p-bis(dimethylsilyl)benzene, triphenylsilane, bis[(p-dimethylsilyl)phenyl] ether, cyclohexyldimethylsilane and the like. Further, the siloxane compound (VII) such as 1,3-diphenyl-1,3-dimethylsiloxane are used.

As the compound (A') having the group for modifying the refractive index and the silicon hydride group, used is not only a low molecular weight compound but also a siloxane polymer having not so high molecular weight produced from the system (1). That is, by the hydrosilyl reaction of the system (1), the siloxane polymer having the group for modifying the refractive index is prepared so as to form a polymer having unreacted silicon hydride groups. Then, the unreacted silicon hydride groups are reacted with the siloxane polymer (B') having the carbon-carbon unsaturated groups.

In the system (2), the compound (C') having at least two silicon hydride groups include dimethylsilane, methylsilane, tetrakis(dimethylsiloxy)silane, 1,1,3,3-tetramethyldisiloxane and the like. Further, the siloxane polymer having unreacted silicon hydride group as described in the above in connection with the system (1) can be used as the compound (C').

The compound (C') may have the group for modifying the refractive index. In some cases, the compound (C') may be the same as the compound (A') when the latter has at least two silicon hydride groups.

The cross-linking of the siloxane polymer may be carried out after the hydrosilyl reaction of the compound (A') and the siloxane polymer (B'), although it may be carried out during the hydrosilyl reaction by adding the compound (C') so that both hydrosilyl reactions proceed competitively.

A typical cross-linking reaction may be represented by the following reaction scheme:

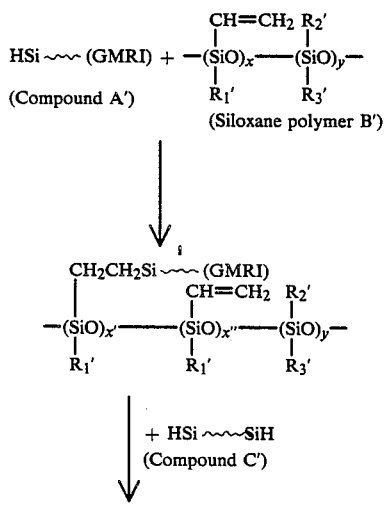

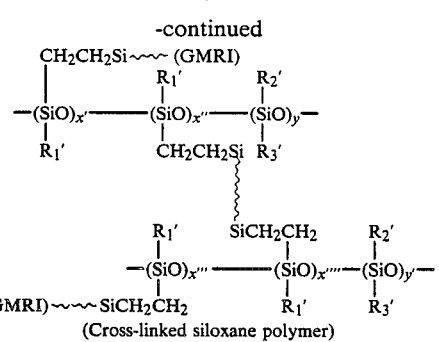

wherein (GMRI) x, x', x", x''', x'''', y, y', $R_1$, $R_2$ and $R_3$ are the same as defined above.

The hydroxyl reaction according to the present invention can be carried out in a suitable solvent (e.g. benzene, toluene, methyl ethyl ketone, tetrahydrofuran and the like) in the presence or absence of a catalyst (e.g. $H_2PtCl_6$, $Na_2PtCl_6$, $PhCl(PPh_3)_3$ and the like). The reaction time is preferably 1 to 100 hours. The polymerization is usually carried out under atmospheric pressure, although it may be carried out in a sealed reactor under high pressure.

According to the present invention, since a suitable amount of any group for modifying the refractive index can be introduced in the siloxane polymer, the refractive index of the siloxane polymer can be precisely controlled as desired. Since it is not necessary to prepare and polymerize a siloxane monomer having a group for modifying the refractive index, economical monomers can be used to synthesize the siloxane polymer having mdified refractive index.

In one embodiment of the present invention, the introduction of the group for modifying the refractive index in the siloxane polymer and the cross-linking of the polymer can simultaneously proceed, so that a cross-linked siloxane polymer with varying refractive index is prepared in one step.

The cross-linked optical siloxane polymer of the present invention finds various applications. For example, it is used as a material having good light transmission (e.g. an optical wave guide, optical fiber, lens and the like) or a splicing which requires matching of the refractive index of elements to be spliced (e.g. splicing of the optical wave guide and the optical fiber, a junction of the optical wave guide and the optical fiber with an optical element).

Presently and practically preferred embodiments of the present invention are illustrated by following examples.

EXAMPLE 1

A siloxane polymer (1.2 g) of the formula:

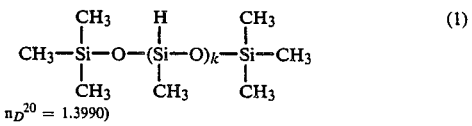

($M_w = 2,900$, $n_D^{20} = 1.3990$)

and 2-vinylnaphthalene (2.4 g) were each dissolved in chloroform (each 10 ml) and mixed. To this mixture, a $4.72 \times 10^{-4}$M solution of $H_2[PtCl_6]$ in methanol (10 ml) was added to proceed the hydrosilyl reaction at 70° C. for 73 hours. Then, the reaction product was precipitated with methanol, and the precipitate was redissolved in toluene and reprecipitated with methanol to obtain a transparent liquid polymer.

The liquid polymer (1 g), 1,3,5-trivinyl-1,1,3,5,5-pentamethyltrisiloxane (0.1 g) and a $3.8 \times 10^{-3}$M solution of $H_2[PtCl_6]$ in isopropanol (0.1 ml) were thoroughly mixed and reacted at 50° C. for 24 hours to obtain a transparent cured product. $n_D^{20} = 1.593$.

The liquid polymer separated from the medium was mixed with water and kept standing for 3 days to obtain a transparent cured product.

EXAMPLE 2

A siloxane polymer (3 g) of the formula:

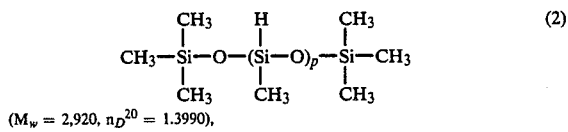

($M_w = 2,920$, $n_D^{20} = 1.3990$), a siloxane polymer (5 g) of the formula:

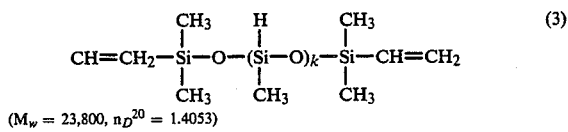

($M_w = 23,800$, $n_D^{20} = 1.4053$)

styrene (3 g) and a $3.8 \times 10^{-3}$M solution of $H_2[PtCl_6]$ in isopropanol (0.15 ml) were thoroughly mixed and reacted at 60° C. for 3 hours to obtain a transparent cured product. $n_D^{20} = 1.462$.

EXAMPLE 3

The siloxane polymer (1) as used in Example 1 (2 g), divinylbenzene (4.7 g) and a $3.8 \times 10^{-3}$M solution of $H_2[PtCl_6]$ in isopropanol (0.1 ml) were thoroughly mixed and reacted at 50° C. for 24 hours to obtain a transparent cured product. $n_D^{20} = 1.469$.

EXAMPLE 4

A siloxane polymer (2.0 g) of the formula:

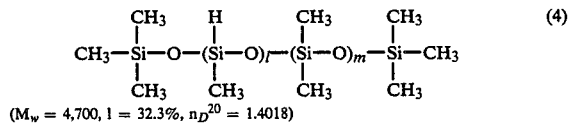

($M_w = 4,700$, $l = 32.3\%$, $n_D^{20} = 1.4018$)

divinylbenzene (0.66 g) and a $3.8 \times 10^{-3}$M solution of $H_2[PtCl_6]$ in isopropanol (0.1 ml) were mixed and reacted at 50° C. for 6 hours to obtain a transparent cured product. $n_D^{20} = 1.455$.

EXAMPLE 5

A siloxane polymer (3.0 g) of the formula:

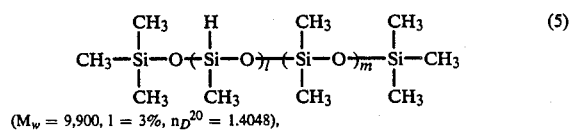

($M_w = 9,900$, $l = 3\%$, $n_D^{20} = 1.4048$), divinylbenzene (0.17 g) and a $3.8 \times 10^{-3}$M solution of $H_2[PtCl_6]$ in isopropanol (0.1 ml) were mixed and reacted at 50° C. for 2.5 hours to obtain a transparent cured product. $n_D^{20} = 1.413$.

EXAMPLE 6

A siloxane polymer (2.0 g) of the formula:

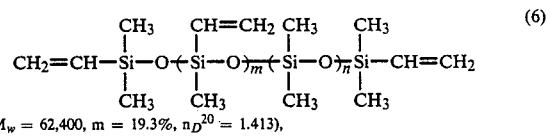

($M_w = 62,400$, $m = 19.3\%$, $n_D^{20} = 1.413$), the siloxane polymer (4) as used in Example 4 (1.0 g), phenyldimethylsilane (1.0 g) and a $3.8 \times 10^{-3}$M solution of $H_2[PtCl_6]$ in isopropanol (0.1 ml) were mixed and reacted at 70° C. for 1 hour to obtain a transparent cured product. $n_D^{20} = 1.421$.

EXAMPLE 7

The siloxane polymer (6) as used in Example 6 (2.0 g), a siloxane polymer (1.0 g) of the formula:

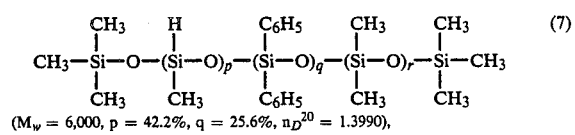

($M_w = 6,000$, $p = 42.2\%$, $q = 25.6\%$, $n_D^{20} = 1.3990$), phenyldimethylsilane (1.0 g) and a $3.8 \times 10^{-3}$M solution of $H_2[PtCl_6]$ in isopropanol (0.1 ml) were mixed and reacted at 70° C. for 1 hour to obtain a transparent cured product. $n_D^{20} = 1.429$.

EXAMPLE 8

A siloxane polymer of the formula:

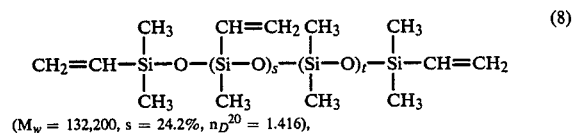

($M_w = 132,200$, $s = 24.2\%$, $n_D^{20} = 1.416$), phenylsilane (0.9 g) and a $3.8 \times 10^{-3}$M solution of $H_2[PtCl_6]$ in isopropanol (0.1 ml) were mixed and reacted at 100° C. for 1 hour to obtain a transparent cured product. $n_D^{20} = 1.43$.

EXAMPLE 9

The siloxane polymer (7) as used in Example 6 (5.0 g), $CH_2=CHC_4F_9$ (1.0 g), a $3.8 \times 10^{-3}$M solution of $H_2[PtCl_6]$ in isopropanol (0.1 ml) were thoroughly mixed and subjected to a hydrosilyl reaction at 50° C. for 3 hours. Then, the reaction product was precipitated with methanol, recovered and dried to obtain a liquid polymer. The liquid polymer (0.2 g), the siloxane polymer (6) as used in Example 6 (1.0 g) and the $3.8 \times 10^{-3}$M solution of $H_2[PtCl_6]$ in isopropanol (0.05 ml) were mixed to proceed additional hydrosilyl reaction at 50° C. for 3 hours. To the reaction mixture, 1,1,3,3-tetramethyldisiloxane (0.05 g) was added and reacted at 70° C. for 1 hour to obtain a transparent cured product. $n_D^{20} = 1.403$.

EXAMPLE 10

The siloxane polymer (7) was used in Example 6 (2.5 g), 9-vinylanthracene (0.5 g), toluene (3 ml) and a $3.8 \times 10^{-3}$M solution of $H_2[PtCl_6]$ in isopropanol (0.05 ml) were thoroughly mixed and subjected to a hydrosilyl reaction at 50° C. for 3 hours. Then, the reaction product was precipitated with methanol, recovered and dried to obtain a liquid polymer. The liquid polymer (0.1 g), the siloxane polymer (6) as used in Example 6 (0.1 g) and the $3.8\times10^{-3}$M solution of $H_2[PtCl_6]$ in isopropanol (0.05 ml) were mixed to proceed additional hydrosilyl reaction at 70° C. for 1 hour to obtain a transparent cured product. $n_D{}^{20}=1.416$.

What is claimed is:

1. A cross-linked optical siloxane polymer having a group for modifying a refractive index of the polymer where the group is introduced in a side chain of an uncrossed-linked siloxane polymer by a hydrosilyl reaction of a compound (A') having a silicon hydride group and a group for modifying a refractive index, and an uncross-linked siloxane polymer (B') having a carbon-carbon unsaturated bond wherein the molar ratio of the carbon-carbon unsaturated bond to the silicon hydride group is more than 1, wherein the uncrossed-linked polymer is cross-linked by a hydrosilyl reaction of the unreacted carbon-carbon unsaturated bonds of the siloxane polymer (B') with a compound (C') having at least two silicon hydride groups.

2. The cross-linked optical siloxane polymer according to claim 1, wherein the compound (C') is a low molecular weight siloxane or silane compound having at least two silicon hydride groups and a group for modifying the refractive index.

3. The cross-linked optical siloxane polymer according to claim 1, wherein the compound (C') is the same as the compound (A').

4. The cross-linked optical siloxane polymer according to claim 1, wherein the group for modifying the refractive index is an aromatic hydrocarbon group.

5. The cross-linked optical siloxane polymer according to claim 4, wherein the aromatic hydrocarbon group is one selected from the group consisting of a phenyl group, a naphthyl group, an anthryl group and a pyrenyl group.

6. The cross-linked optical siloxane polymer according to claim 1, wherein the group for modifying the refractive index is a halogenated hydrocarbon group.

7. The cross-linked optical siloxane polymer according to claim 6, wherein the halogenated hydrocarbon group is a fluorocarbon group.

* * * * *